United States Patent [19]

Sumiyoshi et al.

[11] Patent Number: 4,641,059

[45] Date of Patent: Feb. 3, 1987

[54] CATHODE RAY TUBE

[75] Inventors: Hiroji Sumiyoshi, Tokyo; Teiji Arae, Saitama, both of Japan

[73] Assignee: Sony Corporation, Tokyo, Japan

[21] Appl. No.: 709,392

[22] Filed: Mar. 7, 1985

[30] Foreign Application Priority Data

Mar. 17, 1984 [JP] Japan ................................ 59-51566

[51] Int. Cl.[4] ........................ H01J 31/00; H04N 5/65

[52] U.S. Cl. ................................ 313/477 R; 358/247; 525/17; 525/21; 525/27

[58] Field of Search .................... 358/247; 313/477 R; 525/17, 21, 27

[56] References Cited

U.S. PATENT DOCUMENTS 3,398,213 8/1968 Chetakian ............................ 525/21

3,584,076 6/1971 Chetakian ............................ 525/21

4,204,231 5/1980 Permenter .......................... 358/247

*Primary Examiner*—Allan M. Lieberman

*Attorney, Agent, or Firm*—Lewis H. Eslinger; Alvin Sinderbrand

[57] ABSTRACT

A cathode ray tube of the type which comprises a tube body having a face plate, and a safety panel bonded to the front surface of the face plate through an interlayer of a cured adhesive resin composition. The adhesive resin composition comprises an unsaturated alkyd resin obtained from an unsaturated dicarboxylic acid and a dihydric alcohol, a polymerizable monomer capable of dissolving the unsaturated alkyd resin an organic peroxide catalyst, an organometal compound accelerator, and a chelating agent for the metal in the organometal compound accelerator.

2 Claims, 1 Drawing Figure

FIGURE
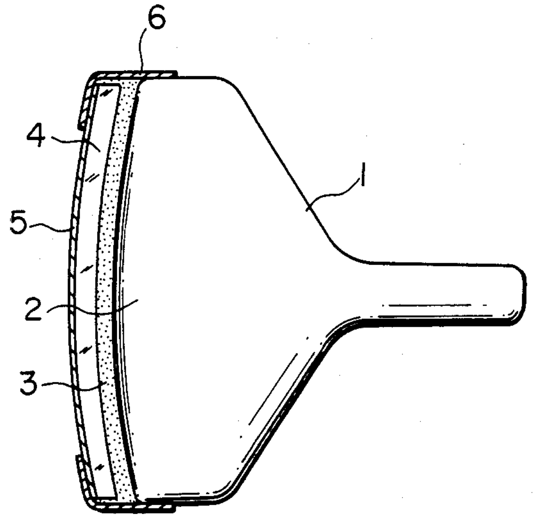

CATHODE RAY TUBE

BACKGROUND OF THE INVENTION

1. Field of the Invention

This invention relates to cathode ray tubes and more particularly, to so-called laminated implosion protection cathode ray tubes in which a safety panel is bonded to the face plate of the tube through a specific type of resin composition.

2. Description of the Prior Art

High resolution picture tubes are now used as video display terminals. As such tubes, there are ordinarily used laminated implosion protection cathode ray tubes in which a tempered safety panel is bonded to the front face of the face plate through adhesive resins. With high quality tubes, an anti-reflective film is further provided on the surface of the safety panel in order to mitigate the fatigue of users. The anti-reflective film can reduce a reflection factor on the safety panel surface by 4%, as compared with the case where no anti-reflective film is used, thus making it easier to watch the screen. With this type of cathode ray tube, it is usual for users to watch the screen at a close range of about 30 cm and thus the screen should desirably be free of any defects. For adhesive resins, there are ordinarily used polyester resins. The polyester resins are inexpensive and have good transparency, weatherability and flexibility, so that they are suitable for use as an interlayer resin. Since any resins which are transparent and flexible may be used as the adhesive resin, epoxy resins and silicone resins are usable for these purposes.

The defects on the screen may be derived from the safety panel, face plate, anti-reflective film, and resin.

When unsaturated polyester resins are used as adhesive resins in the laminated implosion protection cathode ray tube, there are produced, upon curing of the adhesive resin, fine particles of foreign matter whose refractive index is slightly different from the refractive index of the resin. These particles of foreign matter result in heterogeneous defects, or so-called glittering point defects. This glittering point phenomenon does not appear pronounced for domestic cathode ray tubes where the pitches of dots or stripes, or scanning lines on the fluorescent screen are coarse e.g. pitches of dots or stripes exceed 0.5 mm. However, the phenomenon becomes undesirably conspicuous for high resolution picture tubes where pitches of dots and stripes are below 0.4 mm.

SUMMARY OF THE INVENTION

An object of the present invention is to provide a laminated implosion protection cathode ray tube which makes use of unsaturated polyester resins as an adhesive resin for bonding the face plate and an external safety panel together, and which does not produce any glittering point phenomenon.

Another object of the invention is to provide a laminated implosion protection cathode ray tube which can be favorably used as a high resolution picture tube.

The above objects can be achieved, according to the invention, by a laminated implosion protection cathode ray tube which comprises a cathode ray tube body having a face plate, and a safety panel bonded to the front face of the face plate through an interlayer of a cured adhesive resin composition, the adhesive resin composition comprising an unsaturated alkyd resin obtained from an unsaturated dicarboxylic acid and a dihydric alcohol, a polymerizable monomer capable of dissolving the unsaturated alkyd resin, an organic peroxide catalyst, an organometal compound accelerator, and a chelating agent for the metal in the organometal compound accelerator.

The cathode ray tube of the invention is free of heterogeneous defects in the cured resin because of the addition of the chelating agent, and can thus overcome the glittering point defects.

BRIEF DESCRIPTION OF THE DRAWING

The sole FIGURE is a schematic side view, partially in section, of a laminated implosion protection cathode ray tube according to one embodiment of the invention.

DETAILED DESCRIPTION OF PREFERRED EMBODIMENTS OF THE INVENTION

An embodiment of the present invention is particularly described with reference to the sole FIGURE, which shows a cathode ray tube according to the invention. In the FIGURE, indicated by 1 is a cathode ray tube body as a whole, by 2 is a face plate of the tube 1. To the front surface of the face plate 2 is bonded a tempered safety panel 4 through an adhesive resin composition 3. Indicated by 5 is an anti-reflective film formed on the surface of the safety panel 4, and by 6 is a flexible tape for preventing leakage of the casting resin composition.

Manufacture of the cathode ray tube comprises the steps of washing and drying the surfaces of face plate 2 of the cathode ray tube body 1 and the safety panel 4, respectively, placing the safety panel at a given space with respect to the face plate 2, and winding the tape 6 for preventing leakage of the resin composition used to fix the panel. Subsequently, the resin composition 3 is cast into the space between the face plate 2 and the safety panel 4 and cured under conditions described hereinafter. After completion of the curing, the tape 6 is trimmed at the side of the screen, subjected to examination for defects, and finally attached with a band.

In the practice of the invention, the adhesive resin composition comprises an unsaturated polyester resin, to which are added an organic peroxide as a catalyst, an organometal compound, e.g. a metallic soap, as an accelerator, and a chelating agent.

The unsaturated polyester resins used in the present invention are practically used in the form of a liquid resin of an unsaturated alkyd resin dissolved in a polymerizable monomer. The unsaturated alkyd resin is obtained, for example, by esterification between an unsaturated dicarboxylic acid and a dihydric alcohol in any known manner. Examples of the unsaturated dicarboxylic acids include maleic anhydride, fumaric acid, and mixtures thereof with saturated acids or acid anhydrides such as, for example, phthalic anhydride, adipic acid, benzoic acid, and the like. Examples of the dihydric alcohols include ethylene glycol, diethylene glycol and the like. The dihydric alcohols may be partially replaced by monohydric alcohols. The resulting alkyd resin should be dissolved in polymerizable monomers. Polymerizable monomers capable of dissolving the alkyd resin include, for example, styrene monomer.

The unsaturated polyester resins are cured by radical polymerization. Radicals are produced by the combination of an organic peroxide catalyst and an organometal compound accelerator, thereby starting the polymerization. In general, the redox reaction is used for the production of the radicals.

The unsaturated polyester or alkyd resins used as the laminated implosion protector of the cathode ray tube of the invention are so prepared as to be cured at room temperature or moderate temperatures of 60° to 70° C. In practice, an accelerator, a polymerization inhibitor, and a silane coupling agent for improving adhesion to glass are added.

Typical of the accelerator is cobalt (II) naphthenate. Aside from the naphthenate, metallic soaps such as of copper, zinc, iron, and manganese may be used, but they are necessarily suitable for use in cathode ray tube and are not generally used. The amount of the accelerator is generally in the range of from 0.01 to 1.0 phr (6% Co).

The catalyst for the alkyd resin may be organic peroxides including, for example, methyl ethyl ketone peroxide, cyclohexanone peroxide, and the like. Of these, methyl ethyl ketone peroxide is preferably used from the standpoint of curing speed and ease in mixing. The catalyst is generally used in an amount of from 0.5 to 3.0 phr.

The chelating agent which is essential for preventing formation of glittering point defects is, for example, 1,3-diketones, such as, acetylacetone, acetylbenzoylmethane, and the like. The chelating agent of this invention is preferably used in an amount of from 0.05 to 3.0 phr.

The present invention is more particularly described by way of the following examples and comparative examples.

COMPARATIVE EXAMPLE 1

Adhesive resin compositions which were various combinations of unsaturated polyester, catalysts, accelerators, and an antistatic agent indicated below, were used to make laminated implosion protection cathode ray tubes, followed by measuring the number of glittering point defects.

The unsaturated polyester resin used was F-73M (commercial name), made by Showa High-polymer Co., Ltd which is a flexible-type resin. The catalysts used were Permek N (commercial product having a content of methyl ethyl ketone peroxide of 55%), Perhexa H (commercial product having a cyclohexanone peroxide content of 55%), and Nyper BMT (commercial product containing benzoyl peroxide), each commercially available from Nippon Oils and Fats Co., Ltd. The accelerators used were cobalt naphthenate (6% Co), and ferrocene (styrene solution containing 2% of dicyclopentadienyliron). The antistatic agent used was a solution of 1 part by weight of potassium laurate in 7 parts by weight of triethylene glycol.

EXAMPLE 1

Acetylacetone serving as a chelating agent was added, in different amounts, to the respective resin compositions of Comparative Example 1, followed by measuring the number of glittering point defects.

The results of the measurements of the glittering point defects on the respective resins are shown in Table 1.

The glittering point defects were measured using a 20 inch-color cathode ray tube which had an effective screen area of 385 mm×291 mm and pitches of aperture grilles of 0.3 mm and which was produced in a green field.

The glittering point defects of the methyl ethyl ketone peroxide-added resin composition were determined after curing at room temperature and allowing the resin composition to stand for 3 days.

The glittering point defects of cyclohexanone peroxide-added resin composition were determined after confirmation of curing at room temperature and allowing to stand in a cold isothermal bath of +70° C. to −40° C. for 2 days. (two cycles in a day).

About 500 g of each resin composition was used for evaluation.

The abbreviation "phr" used in the present specification means an amount by parts (by weight) per hundred parts of resin.

TABLE 1

| | Antistatic agent | no | | | yes 1 phr | | |
|---|---|---|---|---|---|---|---|
| | Reaction promotor | cobalt naphthenate 0.045 phr | cobalt naphthenate 0.1 phr | cobalt naphthenate 0.0225 phr | cobalt naphthenate 0.1 phr | cobalt naphthenate 0.0225 phr | ferrocene 0.125 phr |
| | Catalyst 1 phr | Permek N | Permek N | Permek N | Permek N | Permek N | Nyper BMT |
| | Acetyl acetone | | | | | | |
| Comp. Ex. 1 | 0 | 20 | 9 | 42 | over 100 | 44 | 16 |
| Ex. 1 | 0.1 phr | — | — | 9 | — | 32 | — |
| | 0.25 phr | 0 | — | 0 | 0 | 12 | 1 |
| | 0.5 phr | 4 | 5 | 3 | 0 | 6 | — |
| | 1.0 phr | — | 0 | 4 | — | 5 | — |

As will be seen from Table 1, when the resin was cured using methyl ethyl ketone peroxide without addition of any antistatic agent, the glittering point defects appeared irrespectively of the amount of cobalt naphthenate. However, it was confirmed that the number of the defects could be reduced by the addition of acetylacetone.

On the other hand, when the antistatic agent was added, the reaction was promoted and such resin composition could be cured using a much smaller amount of cobalt naphthenate. In case where there were used 0.0225 part of cobalt naphthenate and 1 part of Permek N, the number of the glittering point defects was found to be zero when 0.25 part of acetyl acetone was used. Although Table 1 also shows that, when acetylacetone was used in amounts of 0.5 phr and 1 phr, respectively, the number of seeming glittering point defects was found to be 3–4, this was due to defects (such as, pits, adhered glass fragments, and the like) on the face place and the safety panel of the cathode ray tube, and not to the glittering point phenomenon.

Upon curing with cyclohexanone peroxide, or upon curing by addition of ferrocene and Nyper BMT, the number of the glittering point defects could be reduced by the addition of acetylacetone chelating agent.

EXAMPLE 2

F-73M (commercial name) was used as the unsaturated polyester resin, to which were added Permek N catalyst (commercial name) and cobalt naphthenate accelerator, or Nyper BMT catalyst (commercial name) and ferrocene accelerator, followed by further addition of 1 phr of an antistatic agent and 0.25 phr of acetylbenzoylmethane chelating agent. The respective resin compositions were used to make laminated implosion protection cathode ray tubes, followed by measurement of the number of glittering point defects.

The results of the measurement are shown in Table 2.

TABLE 2

| Antistatic agent | 1 phr | 1 phr |
|---|---|---|
| Accelerator | ferrocene 0.125 phr | cobalt naphthenate 0.0225 phr |
| Catalyst | Nyper BMT 1 phr | Permek N 1 phr |
| Number of glittering point defects | 10 | 0 |

From Table 2, it will be seen that when 0.25 part of acetylbenzoylmethane, 1 part of Permek N, and 1 part of the antistatic agent were added to the resin containing 0.0225 part of cobalt naphthenate, the number of glittering point defects were zero.

EXAMPLE 3

The number of glittering point defects of a resin composition comprising a casting resin CDT-3000P (containing an accelerator which is a flexible-type unsaturated polyester resin), made by Hitachi Chemical Co., Ltd., 0.25 phr of acetylacetone and 1 phr of an antistatic agent was determined. For comparison, the number of the defects of the resin in which no acetylacetone was added was also checked. The results are shown in Table 3 below.

TABLE 3

| | | |
|---|---|---|
| Catalyst | CDT-3 (commercial name) 1 phr | CDT-3 (commercial name) 1 phr |
| Additive | no | acetylacetone 0.25 phr |
| Number of glittering point defects | over 100 | 0 |

In Example 3, the addition of acetylacetone as the chelating agent results in the number of glittering point defects being reduced to zero from 100.

Table 4 shows the relation between the resin composition and the curing time.

The unsaturated polyester resins used were F-73M (commercial name) and cobalt naphthenate accelerator-added F-73MB (commercial name), both made by Showa High-polymer Co., Ltd.

TABLE 4

| Resin | Acetyl acetone | Permek N | Antistatic agent | Peak Exotherm temperature | Total time to the peak exotherm temperature |
|---|---|---|---|---|---|
| 1 F-73MB containing 0.0225 phr of cobalt naphthenate | — | 1 phr | 4 phr | 71.4° C. | 71 min. |
| 2 F-73MB containing 0.0225 phr of cobalt naphthenate | — | 1 phr | 1 phr | 77.0 | 77 |
| 3 F-73MB containing 0.0225 phr of cobalt Naphthenate | 0.25 phr | 1 phr | 4 phr | 73.4 | 110 |
| 4 F-73MB containing 0.0225 phr of cobalt naphthenate | 0.25 phr | 1 phr | 1 phr | 74.7 | 110 |
| 5 F-73MB containing 0.0225 phr of cobalt naphthenate | 0.25 phr | 1.5 phr | 1 phr | 81.2 | 95 |
| 6 F-73MB containing 0.0225 phr of cobalt naphthenate | 0.25 phr | 2 phr | 1 phr | 93.5 | 86 |
| 7 F-73MB + 0.045 phr of cobalt naphthenate | 0.25 phr | 1 phr | 1 phr | 78.6 | 98 |
| 8 F-73M + 0.1 phr of cobalt naphthenate | 0.25 phr | 1 phr | 1 phr | 85.96 | 87 |

Note 500 g of the resin was mixed in a beaker and with the necessary additives, followed by measuring the number of the defects in an isothermal water bath of 45° C.

The reason why the glittering point defects are reduced by the addition of acetylacetone or acetylbenzoylmethane is not known. Presumably, this is because glittering point-forming substances are converted into complex compounds by reaction with the diketone and thus combined with the resin. Since glittering point defects are produced even when using accelerators other than cobalt-base compounds, e.g. vanadium compounds, it is assumed that impurities such as water produced by the redox reaction cause the glittering point defects. As for curing, the reaction proceeds more slowly, as will be seen from table 4, when acetylacetone is added, with the tendency that the number of the glittering point defects is smaller at a lower reaction speed.

The number of the glittering point defects depends on the amount of cobalt used as the accelerator, and becomes larger at a higher reaction speed and smaller at a lower reaction speed, so that it is considered that the glittering point defects are heterogeneous defects caused from cobalt. The glittering point defects are further discussed below.

The mechanism of producing radicals from methyl ethyl ketone peroxide and cobalt accelerator is considered to be based on the following electron transfer oxidation-reduction reaction:

$$ROOH + Co^{2+} \rightarrow RO. + OH^- + CO^{+3} \text{ (oxidation)}$$

$$ROOH + Co^{3+} \rightarrow ROO. + H^{+} + CO^{+2} \text{ (reduction)}$$

Co serves to repeatedly decompose the peroxide, without comparison, provided that it may suffer influences of impurities and additives. For instance, if water is present, the following reaction proceeds to impede curing:

$$Co^{2+} + RO. + H_2O \rightarrow Co^{3+} + ROH + OH^{-}$$

As a result, $Co(OH)_3$ is formed to produce black glittering point defects, and $Co(OH)_2$ results in rose red glittering point defects. At the end of polymerization, there is the possibility of forming $H_2O$, and it may be dissolved in resin if small in amounts. However, when the liquid resin is subjected to ultrasonic vibrations or agitation over a long term, thereby decomposing the unsaturated alkyd resin, it is considered to produce large amounts of $H_2O$, causing it possible to produce glittering point defects.

On the other hand, when acetylacetone is added, there are formed chelate compounds such as cobalt bisacetylacetone, $Co(AcAc)_2$, and cobalt di-aquabisacetylacetone, $Co(AcAc)_2(H_2O)_2$. These chelate compounds serve as an initiator of polymerization. Because of the dissolution of such chelate compounds in water, no glittering point defects are produced. With acetylbenzoylmethane, it is also converted into chelate compounds with similar effects being shown.

As will be appreciated from the foregoing, according to the invention, chelating agents are added to unsaturated polyester resin compositions which comprise organometal reaction promotors and organic peroxides as catalysts, so that chelate compounds are produced at the end of the reaction and dissolved in the resin. When these resins are used as the adhesive resins, no glittering point defects are produced in the fabrication of laminated implosion protection cathode ray tubes. These resins are particularly suitable for use in high resolution picture tubes as display devices.

What is claimed is:

1. A cathode ray tube of the type which comprises a tube body having a face plate, and a safety panel bonded to the front surface of the face plate through an interlayer of a cured adhesive resin composition, said adhesive resin composition comprising an unsaturated alkyd resin obtained from an unsaturated dicarboxylic acid and a dihydric alcohol, a polymerizable monomer capable of dissolving the unsaturated alkyd resin, an organic peroxide catalyst, an organometal compound accelerator, and a chelating agent for the metal in the organometal compound accelerator, said chelating agent being a 1,3-diketone selected from the group consisting of acetylacetone and acetylbenzoylmethane and being present in an amount of 0.05 to 3.0 parts, by weight, for each 100 parts of said resin.

2. The cathode ray tube according to claim 1, wherein said polymerizable monomer is styrene monomer, said organic peroxide is selected from the group consisting of methyl ehtyl ketone peroxide and cyclohexanone peroxide, and said organometal compound is cobalt naphthenate.

* * * * *